United States Patent [19]

Bennington

[11] 3,881,502
[45] May 6, 1975

[54] DENTAL FLOSS DISPENSER
[76] Inventor: William E. Bennington, 5 Fillmore Dr., St. Armands, Sarasota, Fla. 33578
[22] Filed: June 25, 1974
[21] Appl. No.: 483,025

Related U.S. Application Data
[63] Continuation-in-part of Ser. Nos. 215,532, Jan. 5, 1972, Pat. No. 3,833,009, and Ser. No. 54,253, July 13, 1970, abandoned.

[52] U.S. Cl. .................................................. 132/91
[51] Int. Cl. ............................................. A61c 15/00
[58] Field of Search .......................... 132/91, 92 R

[56] References Cited
UNITED STATES PATENTS
844,181  2/1907  Overbaugh ...................... 132/92 R
3,833,009  9/1974  Bennington ........................... 132/91

Primary Examiner—G. E. McNeil
Attorney, Agent, or Firm—Millen, Raptes & White

[57] ABSTRACT

This invention relates to a spool type dental floss dispenser comprising a body portion containing a retaining cell for a spool of dental floss and an elongated finger portion from which the dental floss is dispensed. The floss is easily threaded through an open slot channel on the side of the dispenser and exits to pass over serrated means on the top of the dispenser, and re-enters the finger portion, which has an open slot along its length, and exits out the end of the dispenser. Brake means are provided for control of the floss during use.

1 Claim, 3 Drawing Figures

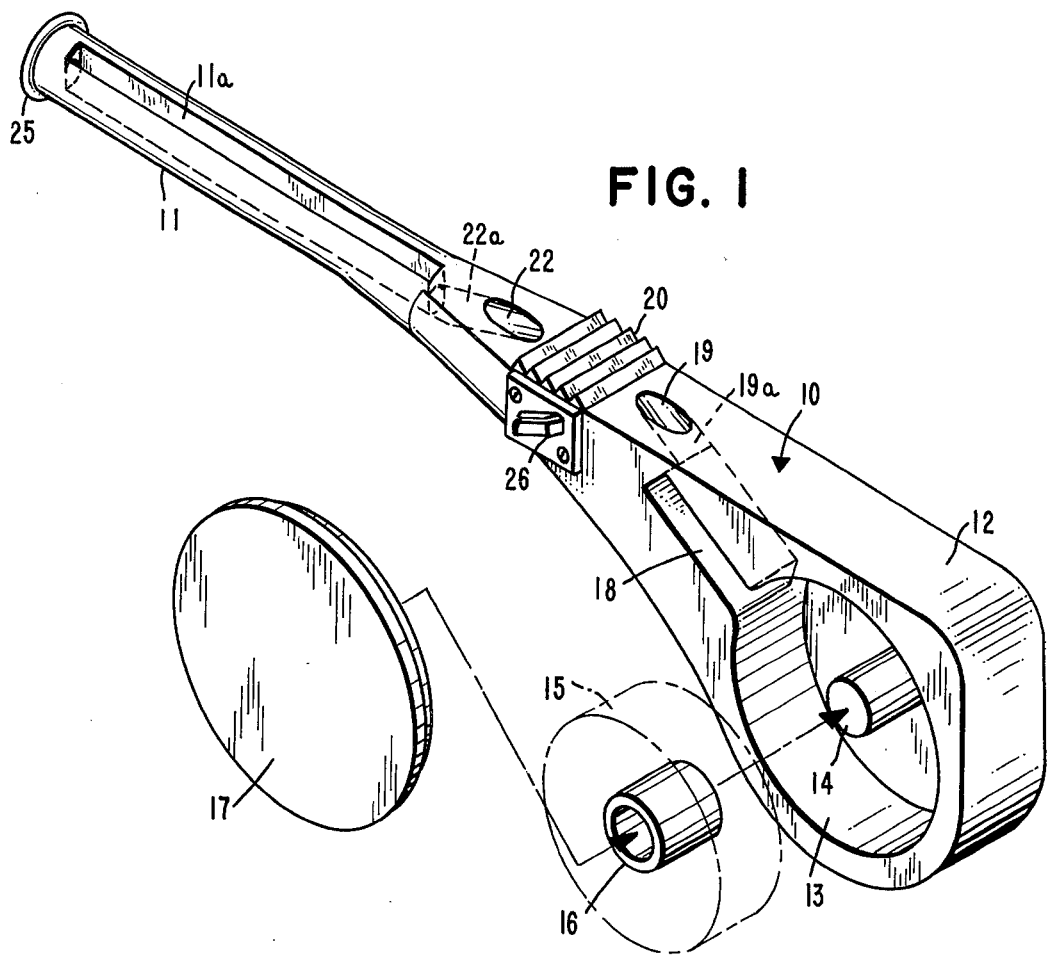
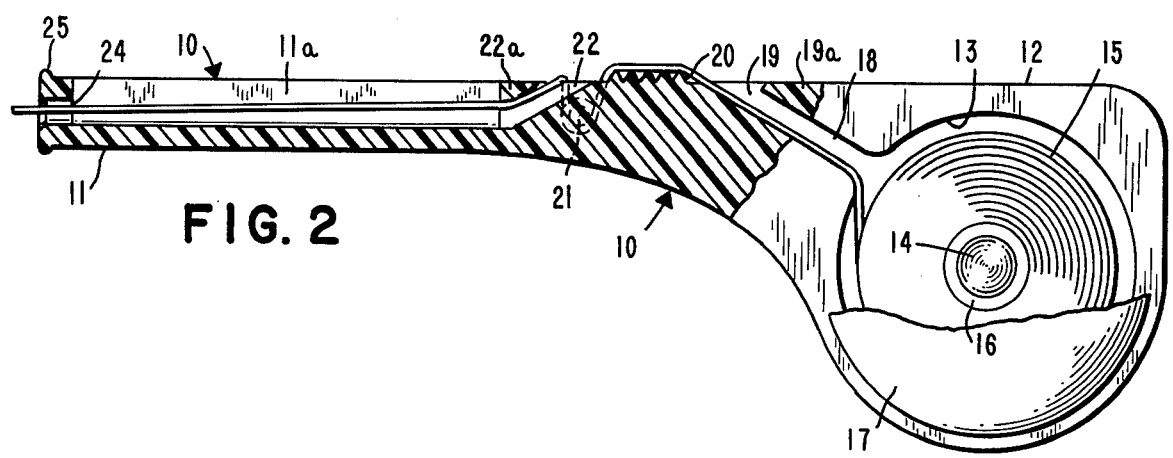
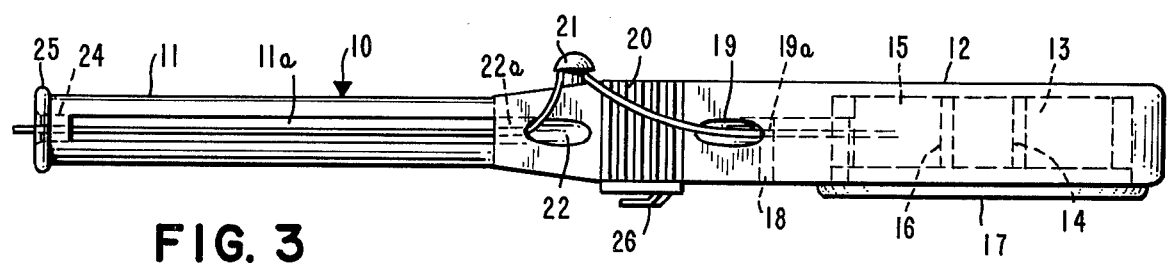

DENTAL FLOSS DISPENSER

This application is a continuation-in-part of copending application Ser. No. 215,532, filed Jan. 5, 1972, now U.S. Pat. No. 3,833,009 and application Ser. No. 54,253 filed July 13, 1970, now abandoned.

This invention relates to an improved dental floss holder and dispenser. More particularly, it relates to a spool-type dispenser having ease of handling and use and providing a simplified construction.

Various dispensers have been available for dental floss and the like. However, with the conventional types, it is difficult to hold the dental floss in tension during use, without comparatively complicated means which increase the cost of the dispenser.

An object of this invention is to provide a dental floss dispenser having ease of handling and use and a simplified construction.

Another object of this invention is to provide a dental floss dispenser having an extended finger which can be inserted into the mouth of the user and which can have dental floss dispensed therefrom without the need for inserting the hands into the mouth.

Another object of this invention is to provide a dental floss dispenser which has means for holding the dental floss under tension during use.

A further object of this invention is to provide a dental floss dispenser having a spool-type reservoir of dental floss having means for easy threading of the floss through the dispenser.

Another object of this invention is to provide a dental floss dispenser having control of the amount of dental floss dispensed along with positive holding action of the floss during use and non-use thereof.

Other features and advantages of the invention will appear from the following detailed description of specifice embodiments thereof taken in connection with the drawings wherein:

FIG. 1 is a perspective view of the dental floss dispenser of this invention;

FIG. 2 is a side elevational view of the dispenser; and

FIG. 3 is a top view of the dispenser.

The dental floss dispenser 10 of FIGS. 1–3 is a unitary body comprising an extended finger section 11 and a spool section 12. The dispenser can be made from an injection moldable plastic material as a throwaway model or from a metal such as stainless steel as a more permanent type model for use by dentists, etc.

The spool section 12 comprises a retaining cell 13 and a rod 14 over which a spool of dental floss 15 contained on a reel 16 can be fitted. A cap 17 fits into the side of the cell 13 to retain the floss therein.

The dental floss passes from the retaining cell along an open slot 18 in the side of the body of the dispenser and exits at a hole 19 containing a retaining member 19a. The floss passes over serrations 20 and down around a braking pin 21 (FIG. 3), then back into a hole 22 in the top of the dispenser. Finger portion 11 comprises an elongated slot 11a which is open to bore hole 23 in finger 11. A retaining member 22a separates hole 22 from the slot 11a. As the floss is threaded through hole 22, it is easily pulled along slot 11a through the end opening 24 and thus the floss exits from the finger 11. The end of the finger 11 comprises an annular smooth flange 25 and a retaining member 11b. A cutter 26 is provided on the dispenser near the serrations on the opposite side from the braking pin.

The dispenser is used by pulling a length of the floss (about 2 inches) from the hole 24, while at the same time releasing pressure of the thumb over the serrations 20 to permit the floss to be withdrawn. The braking pin 21 acts as a braking device during withdrawal and during use. When the desired amount of floss is withdrawn, the thumb is again depressed over the serrations to hold the floss taut during use. The finger 11 is inserted with one hand into the mouth and the end of the floss is gripped with the fingers of the other hand, thereby enabling the floss to be worked between the teeth without putting the fingers into the mouth. As the floss is used, the teeth will have a tendency to shred the floss. When this occurs, the thumb is again released and the floss pulled gently again to withdraw an additional length of floss. The used floss may be cut by bringing the floss under the cutter 26 and pulling sharply upward.

Although it is contemplated that the throwaway type dispenser will not require replacement of a spool of floss, in the permanent type dispenser, the empty spool may easily be replaced. This is done by removing the retaining cap 17, which may be of the screw type of press fit type. The used spool can then be removed and a full spool of floss be inserted and threaded through the dispenser.

It will be understood that modifications, within the scope of the appended claims, may be made in the design and arrangement of the parts without departing from the spirit of the invention.

What is claimed is:

1. A dental floss dispenser comprising a finger section communicating with a spool section, a freely turnable spool of dental floss in said spool section and retaining cap means for retaining said spool in said spool section, a bore hole extending through said finger section and comprising a longitudinal slot along the top thereof communicating with said bore hole, said spool section comprising a side open slot extending from within the spool section to a first hole means in the top of said dispenser, a second hole means in the top of said dispenser communicating with said bore hole, braking means disposed between said first and second hole means comprising top serrated frictional means for manually holding said floss taut during use and pin means on the side of said dispenser around which said floss passes and is also frictionally held during use, whereby said floss is threaded from said spool section through said side slot means, out of said first hole means, over and around said serrated means and pin means, into said second hole means, through said bore means and out the end of said finger means, and whereby said braking means are manually operable during use of said dispenser for frictionally holding said dental floss taut, and when manually released will permit said floss to be freely pulled through said dispenser.

* * * * *